US012759343B2

(12) United States Patent
Sakurai

(10) Patent No.: US 12,759,343 B2
(45) Date of Patent: Oct. 13, 2026

(54) SENSOR HOLDER AND BEARING DEVICE FOR VEHICLE WHEEL

(71) Applicant: NTN CORPORATION, Osaka (JP)

(72) Inventor: Ryou Sakurai, Shizuoka (JP)

(73) Assignee: NTN CORPORATION, Osaka (JP)

( * ) Notice: Subject to any disclaimer, the term of this patent is extended or adjusted under 35 U.S.C. 154(b) by 302 days.

(21) Appl. No.: 18/681,708

(22) PCT Filed: Aug. 2, 2022

(86) PCT No.: PCT/JP2022/029619
§ 371 (c)(1),
(2) Date: Feb. 6, 2024

(87) PCT Pub. No.: WO2023/021980
PCT Pub. Date: Feb. 23, 2023

(65) Prior Publication Data

US 2024/0343065 A1 Oct. 17, 2024

(30) Foreign Application Priority Data

Aug. 20, 2021 (JP) ................................ 2021-135228

(51) Int. Cl.
*B60B 27/00* (2006.01)

(52) U.S. Cl.
CPC ................................ *B60B 27/0068* (2013.01)

(58) Field of Classification Search
CPC ............ B60B 27/0068; B60B 27/0005; B60B 27/0094; F16C 19/186; F16C 33/723;
(Continued)

(56) References Cited

U.S. PATENT DOCUMENTS 7,374,344 B2 * 5/2008 Shigeoka ............ B60B 27/0084 324/207.25
7,556,435 B2 * 7/2009 Nagata .................. F16C 33/723 324/207.25

(Continued)

FOREIGN PATENT DOCUMENTS

EP 3 258 128 12/2017
JP 2006-275205 10/2006

(Continued)

OTHER PUBLICATIONS

International Search Report issued Oct. 18, 2022 in International Application No. PCT/JP2022/029619.

*Primary Examiner* — Freddie Kirkland, III
(74) *Attorney, Agent, or Firm* — Wenderoth, Lind & Ponack, L.L.P.

(57) ABSTRACT

A sensor holder (12) provided with a cap part (121), a sensor support part (122) that protrudes from the cap part (121) toward one side in the axial direction, and supports a rotation speed sensor (13) for detecting displacement of the magnetic encoder (11); and a nut holding part (123) that protrudes from the cap part (121) toward the one side in the axial direction and holds a nut (124) for securing the rotation speed sensor (13) onto the cap part (121). The sensor support part (122) and the nut holding part (123) are formed separately, and one axial end surface (124*a*) of the nut (124) held by the nut holding part (123) protrudes further toward the one side in the axial direction than one axial end surface (122*c*) of the sensor support part (122).

4 Claims, 6 Drawing Sheets

(58) Field of Classification Search
CPC .. F16C 33/783; F16C 41/007; F16C 2326/02; F16C 41/00
See application file for complete search history.

(56) References Cited

U.S. PATENT DOCUMENTS

| | | | | |
|---|---|---|---|---|
| 8,534,126 | B2 * | 9/2013 | Serafini | F16C 41/007 73/431 |
| 8,641,287 | B2 * | 2/2014 | Inoue | F16C 41/007 384/489 |
| 9,056,523 | B2 * | 6/2015 | Norimatsu | B60B 27/0068 |
| 9,970,485 | B2 * | 5/2018 | Takayama | F16C 41/007 |
| 11,298,976 | B2 * | 4/2022 | Sakurai | F16C 41/007 |
| 12,018,717 | B2 * | 6/2024 | Kakuko | F16C 41/00 |
| 2006/0228062 | A1 | 10/2006 | Nagata et al. | |
| 2015/0231922 | A1 * | 8/2015 | Kaiser | F16C 33/7816 384/479 |
| 2018/0003238 | A1 | 1/2018 | Takayama et al. | |

FOREIGN PATENT DOCUMENTS

| | | |
|---|---|---|
| JP | 2016-148422 | 8/2016 |
| WO | 2016/129554 | 8/2016 |

* cited by examiner

FIG. 2
Fig. 2A
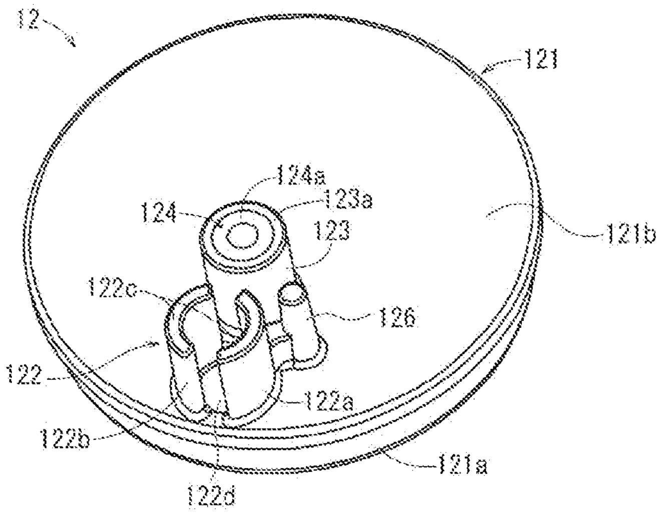
Fig. 2B
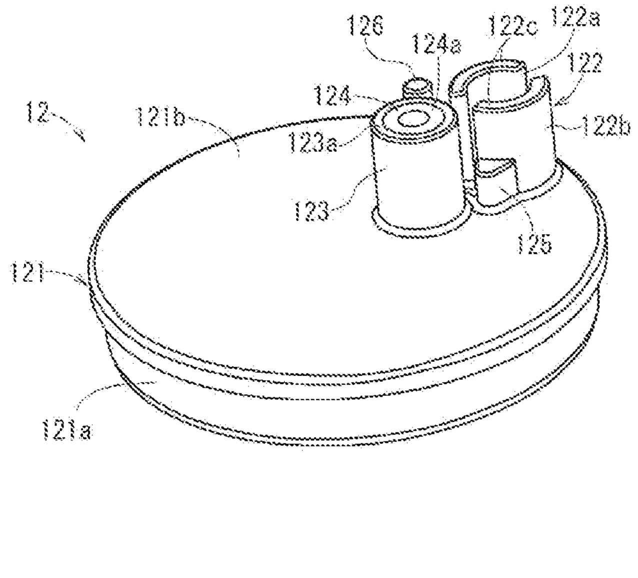

SENSOR HOLDER AND BEARING DEVICE FOR VEHICLE WHEEL

TECHNICAL FIELD

The present invention relates to a sensor holder and a bearing device for vehicle wheel.

BACKGROUND ART

Conventionally, a bearing device for vehicle wheel that rotatably supports a wheel in a suspension device of an automobile or the like is known. There is a bearing device for vehicle wheel in which a rotational speed detection device that detects a rotational speed of a wheel is added to control an antilock brake system (ABS).

For example, in a bearing device for vehicle wheel disclosed in Patent Literature 1, an encoder is supported at an axial end of an inner member, and a sensor holder that supports a sensor for detecting displacement of the encoder is attached to an axial end of an outer member.

The sensor holder includes a cap part fitted to the axial end of the outer member, a sensor support part protruding from a cap part toward one side in the axial direction and supporting the sensor for detecting displacement of the encoder, and a nut holding part protruding from the cap part toward one side in the axial direction and holding a nut for fixing the sensor to the cap part. A mounting flange is fixed to the sensor, and the sensor is fixed to the cap part by fastening the mounting flange to the nut with a bolt in a state where the sensor is fitted to the sensor support part.

The sensor support part and the nut holding part protrude at the same height in the axial direction, and the mounting flange is in contact with both the sensor support part and the nut holding part in a state where the sensor is fixed to the cap part.

CITATION LIST

Patent Literature

Patent Literature 1: JP-A-2016-148422 Gazette

SUMMARY OF INVENTION

Technical Problems

As described above, since a sensor support part and a nut holding part protrude at the same height and are both in contact with a mounting flange, when the sensor support part is warped or a sensor holder has been deformed when being attached to an outer member, a sensor in contact with the sensor support part may be tilted to affect the performance of the sensor to read an encoder.

The present invention has been made in view of the above situation, and provides a sensor holder and a bearing device for vehicle wheel that can prevent an effect on a performance of a sensor to read an encoder caused by a warp of a sensor support part, deformation of the sensor holder, or the like.

Solutions to Problems

That is, a sensor holder is attached to an end portion, in an axial direction, of an outer member that is located on an outer diameter side of an inner member supporting an encoder at an end portion in the axial direction, and rotatably supports the inner member via a double row of rolling elements, the sensor holder including a cap part fitted to the outer member so as to close an opening on one end side in the axial direction of the outer member, a sensor support part that protrudes from the cap part toward one side in the axial direction at a location on the cap part facing the encoder and supports a sensor that detects displacement of the encoder, and a nut holding part that protrudes from the cap part toward one side in the axial direction and holds a nut for fixing the sensor to the cap part. The sensor support part and the nut holding part are formed to be separated from each other, and an end surface on one side in the axial direction of the nut held by the nut holding part protrudes toward one side in the axial direction further than an end surface on one side in the axial direction of the sensor support part.

Advantageous Effects of Invention

According to the present invention, an effect on a performance of a sensor to read an encoder can be prevented.

BRIEF DESCRIPTION OF DRAWINGS

FIG. 2A is an upper perspective view illustrating a sensor holder, and FIG. 2B is a lower perspective view illustrating the sensor holder.

DESCRIPTION OF EMBODIMENT

Hereinafter, a mode for carrying out the present invention will be described with reference to the accompanying drawings.

[Bearing Device for Vehicle Wheel]

Figure 1:
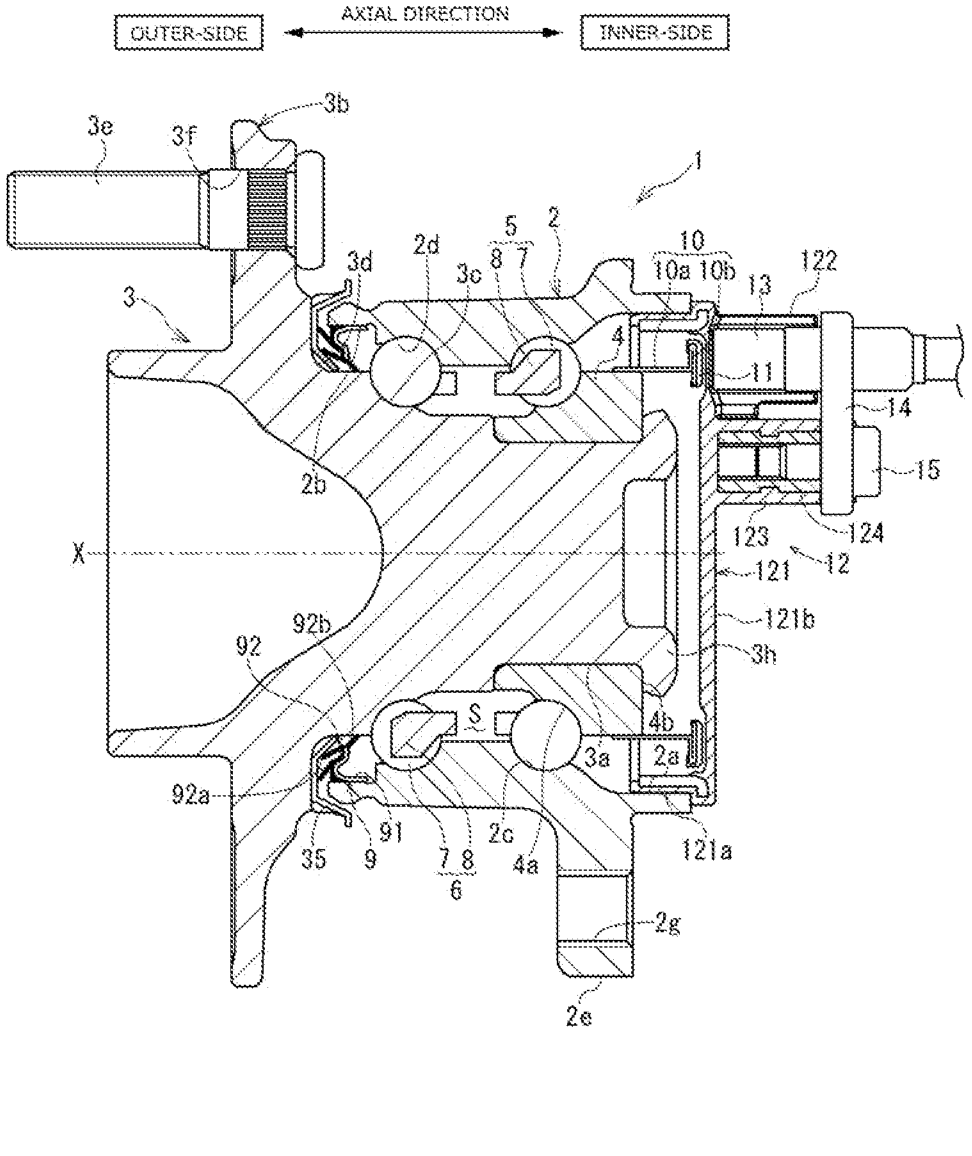
FIG. 1 is a side sectional view illustrating a bearing device for vehicle wheel.

A bearing device for a vehicle wheel 1 illustrated in FIG. 1 is one embodiment of a bearing device for vehicle wheel including a sensor holder according to the present invention, and rotatably supports a wheel in a suspension device of a vehicle such as an automobile.

The bearing device for a vehicle wheel 1 has a configuration called a third generation, and includes an outer ring 2 that is an outer member, a hub ring 3 and an inner ring 4 that are inner members, two roller rows of an inner-side ball row 5 and an outer-side ball row 6, a magnetic encoder 11, and a sensor holder 12.

In the following description, the term, axial direction, represents a direction along a rotation axis X of the bearing device for a vehicle wheel 1. Furthermore, the term, inner-side, represents one side in the axial direction which is closer to a vehicle body when the bearing device for a vehicle wheel 1 is attached to the vehicle body, and the term, outer-side, represents the other side in the axial direction which is closer to the wheel when the bearing device for a vehicle wheel 1 is attached to the vehicle body.

On an inner-side end of the outer ring 2, an inner-side opening 2*a* to which the sensor holder 12 can be fitted is formed. On an outer-side end of the outer ring 2, an outer-side opening 2*b* to which an outer-side sealing member 9 can be fitted is formed. The sensor holder 12 is fitted to the inner-side opening 2*a* that opens at one end side in the axial direction of an annular space S formed by the outer ring 2 and the hub ring 3, and the outer-side sealing member 9 is fitted to the outer-side opening 2*b* that is an opening on the other end side in the axial direction of the annular space S, whereby the annular space S, which is the inside of the bearing is sealed.

On the inner circumferential surface of the outer ring 2, an outer raceway surface 2*c* on the inner-side and an outer raceway surface 2*d* on the outer-side are formed. On the outer circumferential surface of the outer ring 2, a vehicle body mounting flange 2*e* for mounting the outer ring 2 to a vehicle body member is integrally formed. The vehicle body mounting flange 2*e* is provided with a bolt hole 2*g* into which a fastening member (a bolt in the embodiment) for fastening together the vehicle body member and the outer ring 2 is inserted. The outer ring 2 is located on the outer diameter side of the hub ring 3 and the inner ring 4.

On the outer circumferential surface of an inner-side end of the hub ring 3, a small-diameter stepped portion 3*a* of which diameter is smaller than that of the outer-side end of the hub ring 3 is formed. On an outer-side end of the hub ring 3, a vehicle wheel mounting flange 3*b* for mounting a vehicle wheel is integrally formed. A plurality of bolt holes 3*f* is formed in the vehicle wheel mounting flange 3*b*. A hub bolt 3*e* for fastening the hub ring 3 to the vehicle wheel or a brake part is press-fitted in the bolt hole 3*f*.

On the outer circumferential surface of the hub ring 3, an inner raceway surface 3*c* is provided on the outer-side so as to face the outer raceway surface 2*d* on the outer-side of the outer ring 2. That is, on the outer-side of the inner member, the hub ring 3 forms the inner raceway surface 3*c*. A seal land portion 3*d* for the outer-side sealing member 9 is formed on a proximal side of the vehicle wheel mounting flange 3*b* of the hub ring 3.

The outer-side sealing member 9 includes a core metal 91 fitted in the outer-side opening 2*b* of the outer ring 2, and a seal member 92 integrally joined to the core metal 91. A metal ring 35 is fitted in the seal land portion 3*d* of the hub ring 3. A side lip 92*a* of the seal member 92 is in sliding contact with the metal ring 35. That is, the side lip 92*a* of the seal member 92 is in sliding contact with the seal land portion 3*d* of the hub ring 3 via the metal ring 35.

The bearing device for a vehicle wheel 1 however may be configured to have no metal ring 35 so that the side lip 92*a* of the seal member 92 is in direct sliding contact with the seal land portion 3*d* of the hub ring 3. A grease lip 92*b* of the seal member 92 is in direct sliding contact with the seal land portion 3*d* of the hub ring 3.

The inner ring 4 is provided on the small-diameter stepped portion 3*a* of the hub ring 3. The inner ring 4 is fixed to the small-diameter stepped portion 3*a* of the hub ring 3 by press fitting and swaging. The inner ring 4 applies a preload to the inner-side ball row 5 and the outer-side ball row 6 which are roller rows. The inner ring 4 has an inner-side end surface 4*b* at an inner-side end. A swaged portion 3*h* is formed at the inner-side end of the hub ring 3 by swaging to be in contact with the inner-side end surface 4*b* of the inner ring 4.

On the outer circumferential surface of the inner ring 4, an inner raceway surface 4*a* is provided on the inner-side so as to face the outer raceway surface 2*c* on the inner-side of the outer ring 2. That is, on the inner-side of the inner member, the inner ring 4 forms the inner raceway surface 4*a*.

The inner-side ball row 5 and the outer-side ball row 6, which are roller rows, are configured that a plurality of balls 7, or rolling elements, is held by a cage 8. The inner-side ball row 5 is held between the inner raceway surface 4*a* of the inner ring 4 and the outer raceway surface 2*c* on the inner-side of the outer ring 2 so as to roll. The outer-side ball row 6 is held between the inner raceway surface 3*c* of the hub ring 3 and the outer raceway surface 2*d* on the outer-side of the outer ring 2 so as to roll. That is, the inner-side ball row 5 and the outer-side ball row 6 are stored between the raceway surfaces of the outer member and the inner member so as to roll. The outer ring 2 rotatably supports the hub ring 3 and the inner ring 4 via the inner-side ball row 5 and the outer-side ball row 6.

In the bearing device for a vehicle wheel 1, the outer ring 2, the hub ring 3, the inner ring 4, the inner-side ball row 5, and the outer-side ball row 6 constitute a double-row angular ball bearing. The bearing device for a vehicle wheel 1 may constitute a double-row tapered roller bearing instead of the double-row angular ball bearing.

A support ring 10 is fitted to the inner-side end, which is one axial end, of the inner ring 4. The support ring 10 includes a cylindrical portion 10*a* press-fitted on the outer diameter of the inner ring 4 and an upright plate 10*b* extending from an inner-side end of the cylindrical portion 10*a* to the outer diameter side and the inner diameter side. The magnetic encoder 11 is integrally joined to a side surface on the inner-side of the upright plate 10*b* by vulcanized adhesion. In the magnetic encoder 11, magnetic powder such as ferrite is mixed in synthetic rubber, and the magnetic encoder 11 is magnetized to have magnetic poles N and S alternately arranged at a constant pitch in the circumferential direction. The magnetic encoder 11 is an example of an encoder.

The sensor holder 12 is attached to the inner-side opening 2*a* that opens at one end side in the axial direction of the outer ring 2 so as to close the inner-side opening 2*a*. A rotation speed sensor 13 is attached to the sensor holder 12 at a location facing the magnetic encoder 11. The rotation speed sensor 13 and the magnetic encoder 11 are disposed to face each other in the axial direction with a predetermined air gap (axial gap) therebetween and through the sensor holder 12. The rotational speed of the inner ring 4 can be detected by detecting the displacement of the magnetic encoder 11 by the rotation speed sensor 13. The rotation speed sensor 13 is an example of a sensor that detects the displacement of the encoder.

[Sensor Holder]

The sensor holder 12 is formed of, for example, a resin member. When the sensor holder 12 is formed of a resin member, the sensor holder 12 may be an injection-molded product or a machined product.

Figure 3:
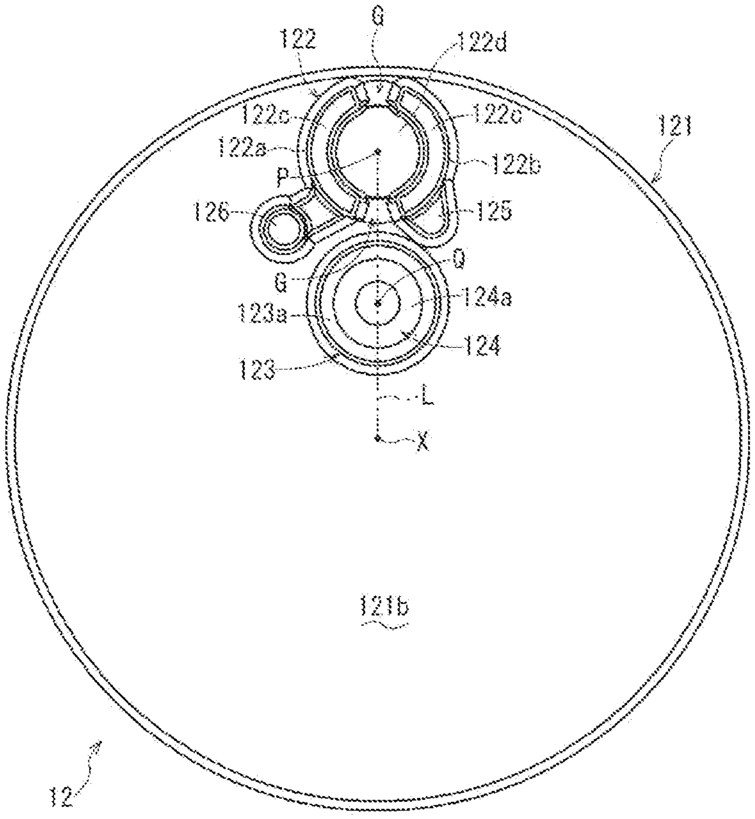
FIG. 3 is a view illustrating a sensor holder viewed along an axial direction from an inner-side.
Figure 4:
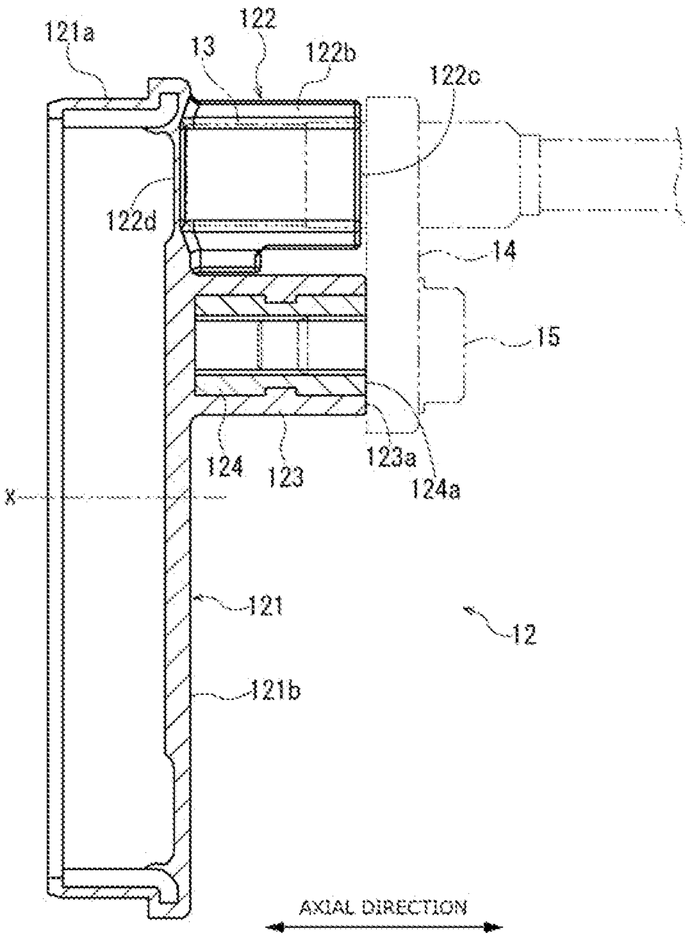
FIG. 4 is a side sectional view illustrating the sensor holder.

As illustrated in FIGS. 2 to 4, the sensor holder 12 includes a cap part 121, a sensor support part 122, a nut holding part 123, and a nut 124.

The cap part 121 has a cylindrical fitting portion 121*a* press-fitted to the inner-side opening 2*a* of the outer ring 2 and a bottom surface portion 121*b* extending radially inward from the fitting portion 121*a* to close the inner-side opening 2*a*. The cap part 121 is fitted to the outer ring 2 so as to close the inner-side opening 2*a*.

The sensor support part 122 protrudes from the bottom surface portion 121*b* of the cap part 121 toward one side in the axial direction, and supports the rotation speed sensor 13. The sensor support part 122 is disposed on the bottom surface portion 121*b* at a location facing the magnetic encoder 11. In the present embodiment, the sensor support part 122 of the sensor holder 12 attached to the bearing device for a vehicle wheel 1 is located at an upper end of the bottom surface portion 121*b*.

The sensor support part 122 has a first portion 122*a* and a second portion 122*b* formed in an arc shape in a view in the axial direction. The first portion 122*a* and the second portion 122*b* are disposed to face each other with a gap therebetween, so that the sensor support part 122 has a substantially cylindrical shape having a gap G (see FIG. 3) at an upper end and a lower end as a whole.

The rotation speed sensor 13 is inserted into the sensor support part 122 from one end in the axial direction. In a state where the rotation speed sensor 13 is inserted in the sensor support part 122, rainwater entered into the inside of the sensor support part 122 can be discharged from the gap G to the outside.

A reinforcing portion 125 is formed at a proximal end which is an end portion on the bottom surface portion 121*b* side of the second portion 122*b*. The reinforcing portion 125 is formed integrally with the second portion 122*b* and the bottom surface portion 121*b*. The reinforcing portion 125 improves the rigidity of the sensor support part 122.

A bottom surface 122*d* is formed at an end portion on the bottom surface portion 121*b* side of the sensor support part 122, so that the sensor support part 122 is not penetrating in the axial direction. Therefore, the rotation speed sensor 13 inserted into the sensor support part 122 faces the magnetic encoder 11 through the bottom surface 122*d*. The bottom surface 122*d* is formed to be thinner than the other portion, that is, the bottom surface portion 121*b*.

However, the sensor support part 122 may be formed as a penetrating type that has no bottom surface 122*d* and in which the rotation speed sensor 13 inserted into the sensor support part 122 directly faces the magnetic encoder 11.

The nut holding part 123 protrudes toward one side in the axial direction from the bottom surface portion 121*b* of the cap part 121. The nut holding part 123 is formed to be discontinuously separated from the sensor support part 122, and is located on the inner diameter side of the sensor support part 122 on the bottom surface portion 121*b*. That is, the nut holding part 123 is located closer to the rotation axis X than the sensor support part 122.

As illustrated in FIG. 3, in the present embodiment, center Q of the nut holding part 123 is on a straight line L extending from the rotation axis X to the outer diameter side and connecting the rotation axis X and center P of the sensor support part 122. That is, the rotation axis X, the center Q, and the center P are on the same straight line L. However, the center Q of the nut holding part 123 may be at a location shifted from the straight line L.

The nut holding part 123 is formed in a cylindrical shape, and the nut 124 is held inside the nut holding part 123. The nut 124 can be integrally formed together with the sensor holder 12 by insert molding or the like when the sensor holder 12 is formed. The nut 124 can be fitted in the nut holding part 123 by press fitting after the sensor holder 12 is formed. Furthermore, the nut 124 can be fitted in the nut holding part 123 and then bonded to be fixed to the nut holding part 123.

Figure 5:
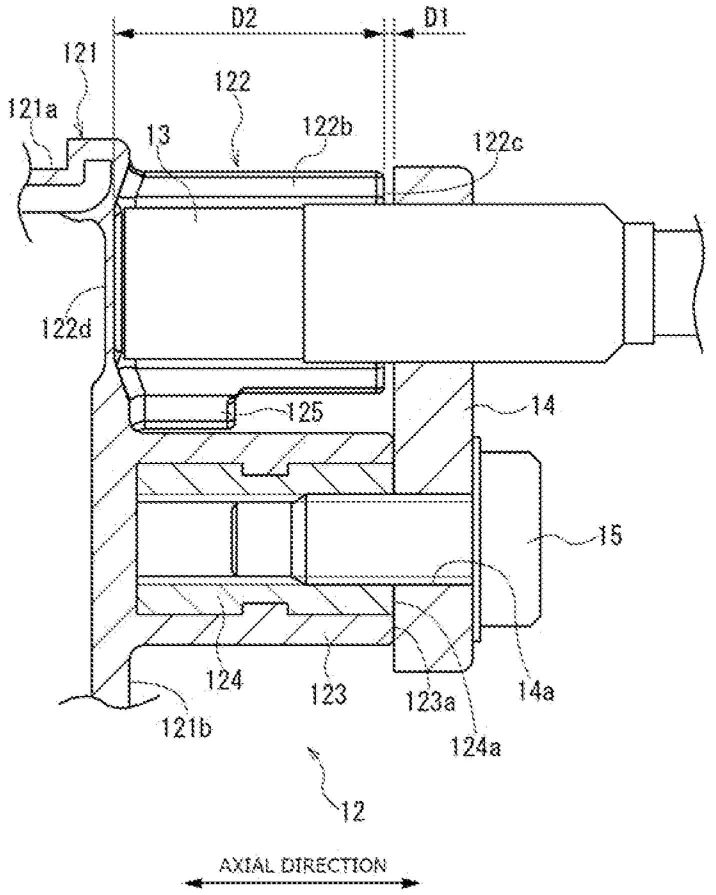
FIG. 5 is a partially enlarged side sectional view illustrating a sensor holder to which a rotation speed sensor is attached.

As illustrated in FIG. 5, the mounting flange 14 is fixed to the rotation speed sensor 13. The mounting flange 14 extends in the radial direction from the rotation speed sensor 13 toward the nut holding part 123, and has a fixing hole 14*a* penetrating in the axial direction at a location facing the nut 124 held by the nut holding part 123.

With the rotation speed sensor 13 fitted in the sensor support part 122, a bolt 15 is inserted into the fixing hole 14*a* of the mounting flange 14, and the mounting flange 14 is fastened to the nut 124 with the bolt 15, whereby the rotation speed sensor 13 is fixed to the sensor holder 12.

An end surface 124*a* in the axial direction of the nut 124 is formed so as to protrude toward one side in the axial direction than or to be at the same axial location (see FIG. 6) as an end surface 123*a* in the axial direction of the nut holding part 123. The end surface 123*a* of the nut holding part 123 is located in the periphery of the end surface 124*a* of the nut 124.

Therefore, in fastening of the mounting flange 14 to the nut 124 with the bolt 15, the mounting flange 14 will not contact the end surface 123*a* of the nut holding part 123 before contacting the end surface 124*a* of the nut 124, and thus the mounting flange 14 can be brought into tight contact with the end surface 124*a* of the nut 124. As a result, the rotation speed sensor 13 can be fixed to the sensor holder 12 with high positional accuracy.

Figure 6:
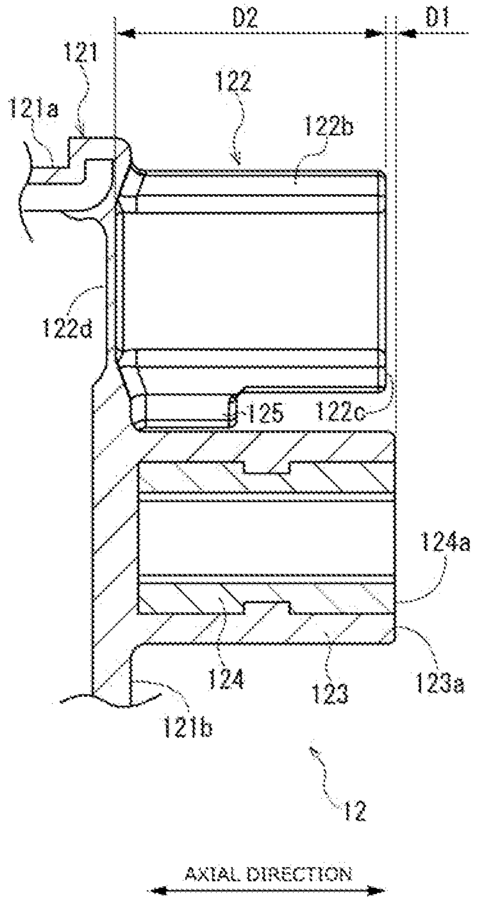
FIG. 6 is a partially enlarged side sectional view illustrating the sensor holder.

As illustrated in FIG. 6, the end surface 124*a* of the nut 124 protrudes to one side in the axial direction by a dimension D1 further than an end surface 122*c* in the axial direction of the sensor support part 122. That is, there is a difference in elevation in the axial direction by the dimension D1 between the end surface 124*a* of the nut 124 and the end surface 122*c* of the sensor support part 122.

Therefore, as illustrated in FIG. 5, when the mounting flange 14 is fastened to the nut 124 with the bolt 15 to fix the rotation speed sensor 13 to the sensor holder 12, there is a gap in the axial direction by the dimension D1 between the end surface 122*c* of the sensor support part 122 and the mounting flange 14, so that the mounting flange 14 and the sensor support part 122 are not in contact with each other.

As described above, by forming the sensor support part 122 and the nut holding part 123 separately and with a difference in elevation between each other, even when the sensor support part 122 is warped or the sensor holder 12 has been deformed, tilting of the rotation speed sensor 13 due to deformation of the sensor support part 122 can be suppressed. Accordingly, an effect on the performance of the rotation speed sensor 13 to read the magnetic encoder 11 can be prevented.

The dimension D1 of the difference in elevation between the end surface 124*a* of the nut 124 and the end surface 122*c* of the sensor support part 122 is preferably 0.2 mm or more from the viewpoint of preventing tilting of the rotation speed sensor 13. However, an excessively large dimension D1 of the difference in elevation reduces a depth dimension D2, which is an axial length of the sensor support part 122, and may degrade the positional accuracy for supporting the rotation speed sensor 13. Therefore, the dimension D1 of the difference in elevation is preferably set to a value that can secure the depth dimension D2 of 5 mm or more.

In addition, since the sensor support part 122 and the nut holding part 123 are formed separately, there is no need to provide a thick resin member portion for connecting the sensor support part 122 and the nut holding part 123. This makes it easy to form the sensor support part 122 and the nut holding part 123 to have a cylindrical shape having a uniform thickness in the circumferential direction.

In addition, by forming the sensor support part 122 and the nut holding part 123 to have no thick portion, deformation of the sensor holder 12 such as a sink mark and a warp that may happen during resin-forming can be suppressed. Furthermore, since there is no need to perform lightening of a thick portion between the sensor support part 122 and the nut holding part 123, the shape of a mold for forming the sensor holder 12 can be simplified.

In addition, a warp or deformation of the sensor holder 12 that may happen when the sensor holder 12 is press-fitted to the outer ring 2 tends to be larger on the outer diameter side than on the inner diameter side. In this regard, in the sensor holder 12, the nut holding part 123 for fixing the rotation speed sensor 13 with the bolt 15 is on the inner diameter side closer to the rotation axis X than the sensor support part 122. This reduces an effect by deformation or the like of the sensor holder 12 on the posture of the rotation speed sensor 13, and thus tilting of the rotation speed sensor 13 can be suppressed.

As illustrated in FIGS. 2 and 3, the sensor holder 12 includes a gate portion 126. The gate portion 126 serves as an inlet for filling a mold with resin when the sensor holder 12 is formed using the mold. The gate portion 126 is located between the sensor support part 122 and the nut holding part 123 in the radial direction. In the present embodiment, the gate portion 126 is disposed at an intermediate location in the radial direction between the center P of the sensor support part 122 and the center Q of the nut holding part 123. The gate portion 126 is integrally formed with the first portion 122*a* and the bottom surface portion 121*b*. The gate portion 126 improves the rigidity of the sensor support part 122.

As described above, disposing the gate portion 126 between the sensor support part 122 and the nut holding part 123 improves the fluidity of resin to be filled in the mold, so that the spaces for forming the sensor support part 122 and the nut holding part 123 can be suitably filled with resin, and the space for forming the bottom surface 122*d*, which is a thin portion, can also be suitably filled with resin.

In addition, the gate portion 126 is located near the sensor support part 122 and the nut bolding part 123 in the circumferential direction, so that filling of resin for the sensor support part 122 and the nut holding part 123 can be suitably performed.

Furthermore, the bearing device for a vehicle wheel 1 according to the present embodiment is configured as a bearing device for a vehicle wheel 1 having a third-generation structure in which the inner raceway surface 3*c* is directly formed on the outer circumference of the hub ring 3, but is not limited thereto, and may have a second-generation structure in which a pair of inner rings 4 is press-fitted and fixed to the hub ring 3.

Although the embodiment of the present invention have been described above, the present invention is not limited to the embodiment, which are merely an example. It is needless to say that the present invention can be implemented in various forms without departing from the gist of the present invention. The scope of the present invention is indicated by the description of the claims, and further includes the equivalent meaning and all changes within the scope of the claims.

INDUSTRIAL APPLICABILITY

The present invention is applicable to a sensor holder and a bearing device for vehicle wheel.

REFERENCE SIGNS LIST

1 bearing device for vehicle wheel
2 outer ring
2*a* inner-side opening
2*c* outer raceway surface (on inner-side)
2*d* outer raceway surface (on outer-side)
3 hub ring
3*a* small-diameter stepped portion
3*c* inner raceway surface (of hub ring)
4 inner ring
4*a* inner raceway surface (of inner ring)
5 inner-side ball row
6 outer-side ball row
13 rotation speed sensor
11 magnetic encoder
12 sensor holder
121 cap part
122 sensor support part
122*c* end surface (of a sensor support part)
123 nut holding part
124 nut
124*a* end surface (of a nut)
X rotation axis

The invention claimed is:

1. A sensor holder attached to an end portion, in an axial direction, of an outer member that is located on an outer diameter side of an inner member supporting an encoder at an end portion in the axial direction, and rotatably supports the inner member via a double row of rolling elements, the sensor holder comprising:

a cap part fitted to the outer member so as to close an opening on one end side in the axial direction of the outer member;

a sensor support part that protrudes from the cap part toward one side in the axial direction at a location on the cap part facing the encoder, and that supports a sensor that detects displacement of the encoder; and a nut holding part that protrudes from the cap part toward one side in the axial direction and holds a nut for fixing the sensor to the cap part, wherein the sensor support part and the nut holding part are formed to be separated from each other, an axial end surface of the nut held by the nut holding part protrudes toward one side in the axial direction further than an axial end surface of the sensor support part, and wherein a step dimension between the axial end surface of the nut and the axial end surface of the sensor support part is 0.2 mm or more, and a depth dimension of the sensor support part in the axial direction is 5 mm or more.

2. The sensor holder according to claim 1, wherein the nut holding part is located further on an inner diameter side than the sensor support part.

3. A bearing device for a vehicle wheel, comprising:

the outer member, wherein the outer member has a double row of outer raceway surfaces on an inner circumference;

the inner member, wherein the inner member includes a hub ring having, on an outer circumference, a stepped portion extending in an axial direction, and at least one inner ring press-fitted to the stepped portion of the hub ring, the inner member having a double row of inner raceway surfaces facing the double row of outer raceway surfaces;

the double row of rolling elements, wherein the double row of rolling elements is stored between the outer raceway surfaces of the outer member and the inner raceway surfaces of the inner member so as to roll;

the encoder supported at one end in the axial direction of the inner member; and the sensor holder according to claim 1 attached to one end in the axial direction of the outer member.

4. A bearing device for a vehicle wheel, comprising:

the outer member, wherein the outer member has a double row of outer raceway surfaces on an inner circumference;

the inner member, wherein the inner member includes a hub ring having, on an outer circumference, a stepped portion extending in an axial direction, and at least one inner ring press-fitted to the stepped portion of the hub ring, the inner member having a double row of inner raceway surfaces facing the double row of outer raceway surfaces;

the double row of rolling elements, wherein the double row of rolling elements is stored between the outer raceway surfaces of the outer member and the inner raceway surfaces of the inner member so as to roll;

the encoder supported at one end in the axial direction of the inner member; and the sensor holder according to claim 2 attached to one end in the axial direction of the outer member.

* * * * *